(12) United States Patent
Munger

(10) Patent No.: US 7,284,780 B1
(45) Date of Patent: Oct. 23, 2007

(54) VISOR ORGANIZER

(76) Inventor: Kathryn Munger, P.O. Box 1572, Florence, OR (US) 97439

( * ) Notice: Subject to any disclaimer, the term of this patent is extended or adjusted under 35 U.S.C. 154(b) by 0 days.

(21) Appl. No.: 11/481,996

(22) Filed: Jul. 6, 2006

(51) Int. Cl.
*B60R 7/04* (2006.01)
(52) U.S. Cl. .................................................. 296/37.8
(58) Field of Classification Search ......... 296/24.3, 296/24.34, 24.4, 37.1, 37.6, 37.7, 37.8, 37.9, 296/37.12, 37.13; 224/311, 545, 555, 556, 224/557, 563, 572
See application file for complete search history.

(56) References Cited

U.S. PATENT DOCUMENTS

| | | | | |
|---|---|---|---|---|
| 2,568,046 A | * | 9/1951 | Wilkinson | 224/539 |
| 3,847,316 A | * | 11/1974 | McInnes | 224/311 |
| 3,856,192 A | * | 12/1974 | Nelson | 224/311 |
| 4,079,987 A | * | 3/1978 | Bumgardener | 296/37.7 |
| 4,226,460 A | * | 10/1980 | Schmidt et al. | 296/37.7 |
| 4,275,913 A | | 6/1981 | Marcus | |
| 4,275,916 A | | 6/1981 | Skogler | |
| 4,717,193 A | * | 1/1988 | Noriega | 296/37.7 |
| D314,739 S | * | 2/1991 | Mallone | D12/424 |
| 5,310,237 A | * | 5/1994 | McCloy et al. | 296/97.5 |
| 5,364,153 A | | 11/1994 | Vaxelaire | |
| 5,943,805 A | | 8/1999 | Huang et al. | |
| 6,024,400 A | | 2/2000 | Donoughe et al. | |
| 6,598,928 B1 | | 7/2003 | Drake et al. | |

* cited by examiner

*Primary Examiner*—H Gutman

(57) ABSTRACT

An article storage accessory for use on a motor vehicle has a length dimension that is essentially equal to the width dimension of the cabin of the motor vehicle so the accessory extends across the cabin. The accessory is located adjacent to the headliner of the cabin and is located adjacent to the sun visors of the motor vehicle. The accessory includes a plurality of pockets and is covered by the sun visors when they are in an up position and uncovered when they are in a windshield shading position adjacent to the windshield.

3 Claims, 2 Drawing Sheets

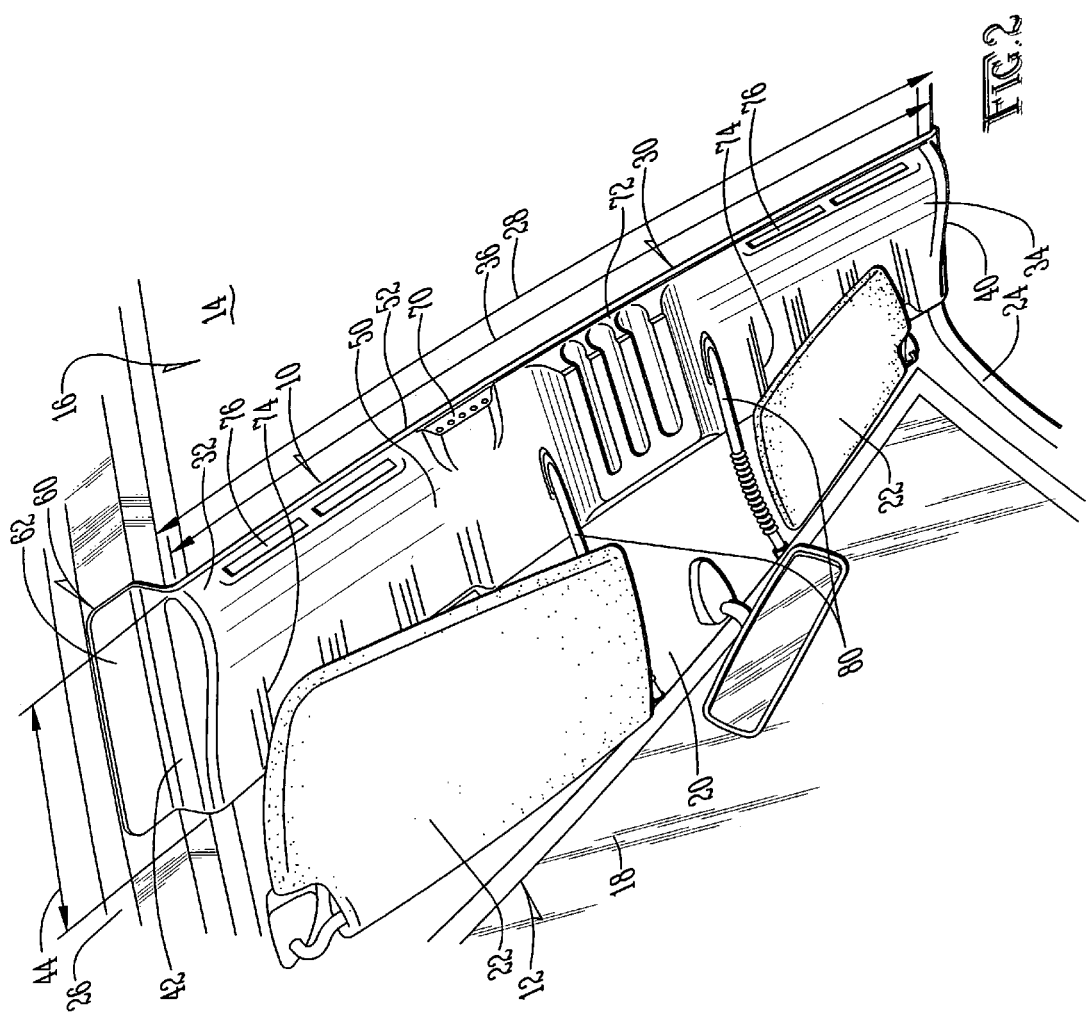

VISOR ORGANIZER

TECHNICAL FIELD OF THE INVENTION

The present invention relates to the general art of motor vehicles, and to the particular field of storage accessories for motor vehicles.

BACKGROUND OF THE INVENTION

In automotive vehicles such as automobiles, pick-up trucks, recreational vehicles and the like, a problem frequently arises in finding sufficient storage space for various articles which are to be carried in the vehicle. Such articles include, eyeglasses, sunglasses, cards, paper products, pens, pencils, maps, calendars, calculators, and the like. A driver often desires ready access to such items. Most automobiles and light trucks have glove compartments in them. These glove compartments, however, are of relatively limited capacity and are suitable only for storing small articles such as maps, flashlights and the like. In addition, glove compartments usually are located at the right-hand end of the vehicle dashboard and are difficult to reach from the driver's seat. This is particularly true of pick-up trucks which have a relatively wide body width. If a flashlight or small fire extinguisher is placed in a conventional glove compartment, it usually is filled or nearly filled by such an article, thereby rendering storage of other items in the glove compartment difficult or impossible.

Some vehicles have additional pockets or compartments placed in the doors and, in the case of pick-up trucks, there may be limited storage behind the seat. Behind-the-seat storage, however, is inconvenient since usually it is necessary for the vehicles to be stopped and the driver and passenger to be out of the seat to permit pulling the back forward to gain access to anything stored behind it. Many recent model automobiles and trucks also incorporate tape and disc players as part of the sound system, and it is necessary to find a storage location for tapes and compact discs carried into the vehicle for playing in such players.

One result of this dearth of storage space is the placement of a variety of articles on the dashboard of the vehicle. This is unsightly, the sun can cause substantial damage to or actually destroy any tapes or heat-sensitive plastic articles placed in such a location, and articles placed on top of the dashboard create a distraction to the driver and interfere with the operation of the defrosters and may fall off the dashboard which can create a danger to a passenger or to the driver, let alone a danger of damaging the article itself.

In an effort to provide additional and unobtrusive storage for vehicles, various attempts have been made in the past for mounting racks, storage units, or shelves adjacent the roof of the vehicles. Many such racks are custom designed cabinets or compartments for housing stereo components, CB radios and other electric gear. A wide variety of racks have been devised for storing tape cartridges to be played in the vehicle cartridge tape player. However, many racks must be nearly custom made for the particular vehicle and thus may be very expensive. Even then, such racks may not provide sufficient storage space.

Other efforts to provide increased storage in a vehicle by means of a shelf located at or adjacent the ceiling. However, such shelves may be unsightly and may interfere with operation of the motor vehicle.

Other storage cabinets, requiring substantially custom installation, are available for location above the dashboard of the vehicle adjacent the upper edge of its windshield. Since such storage cabinets, as so far are known to applicant, require custom design and fitting and, further, require the drilling of holes in the vehicle roof or body frame components, they are not universally adaptable and generally are not of the type which can be installed by the vehicle owner himself.

It is well known to provide a sun visor for the windshield of a vehicle, wherein the sun visor is mounted on a roof panel of the vehicle for movement between a storage position adjacent the vehicle headliner, a first use position adjacent the windshield, and a second use position adjacent a side-door window opening.

In an effort to provide storage space, some automobile sun visors are provided with an accessory article that is fastened therewith for keeping a variety of small items, such as business card, picture, driver's license, pen, small notebook, pamphlet, etc. In view of the fact that the accessory article of the automobile sun visor is not provided with an organizer, these small items are often kept in a disorganized manner. In addition, the accessory article undermines the esthetic effect of the automobile sun visor. Additionally, add on devices which are strapped to the vehicle sun visors can be bulky and pose a safety hazard to the vehicle operator in the event of an accident since if attached to the visor, they are located at the head level of the vehicle. Also, they detract from the appearance of the vehicle interior and are frequently inconvenient to use.

Therefore, there is a need for a means for storing items in a motor vehicle which will not have the disadvantages mentioned above.

SUMMARY OF THE INVENTION

The above-discussed disadvantages of the prior art are overcome by a storage accessory that is mounted on the headliner of a motor vehicle above the sunvisors of that vehicle. The accessory includes a plurality of pockets. The accessory is clipped to the roof of the motor vehicle and is thus easy to mount and to dismount if desired.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 2 is a perspective view showing the motor vehicle storage accessory embodying the present invention installed in a motor vehicle above the sun visor(s) of the motor vehicle.

DETAILED DESCRIPTION OF THE INVENTION

Figure 1:
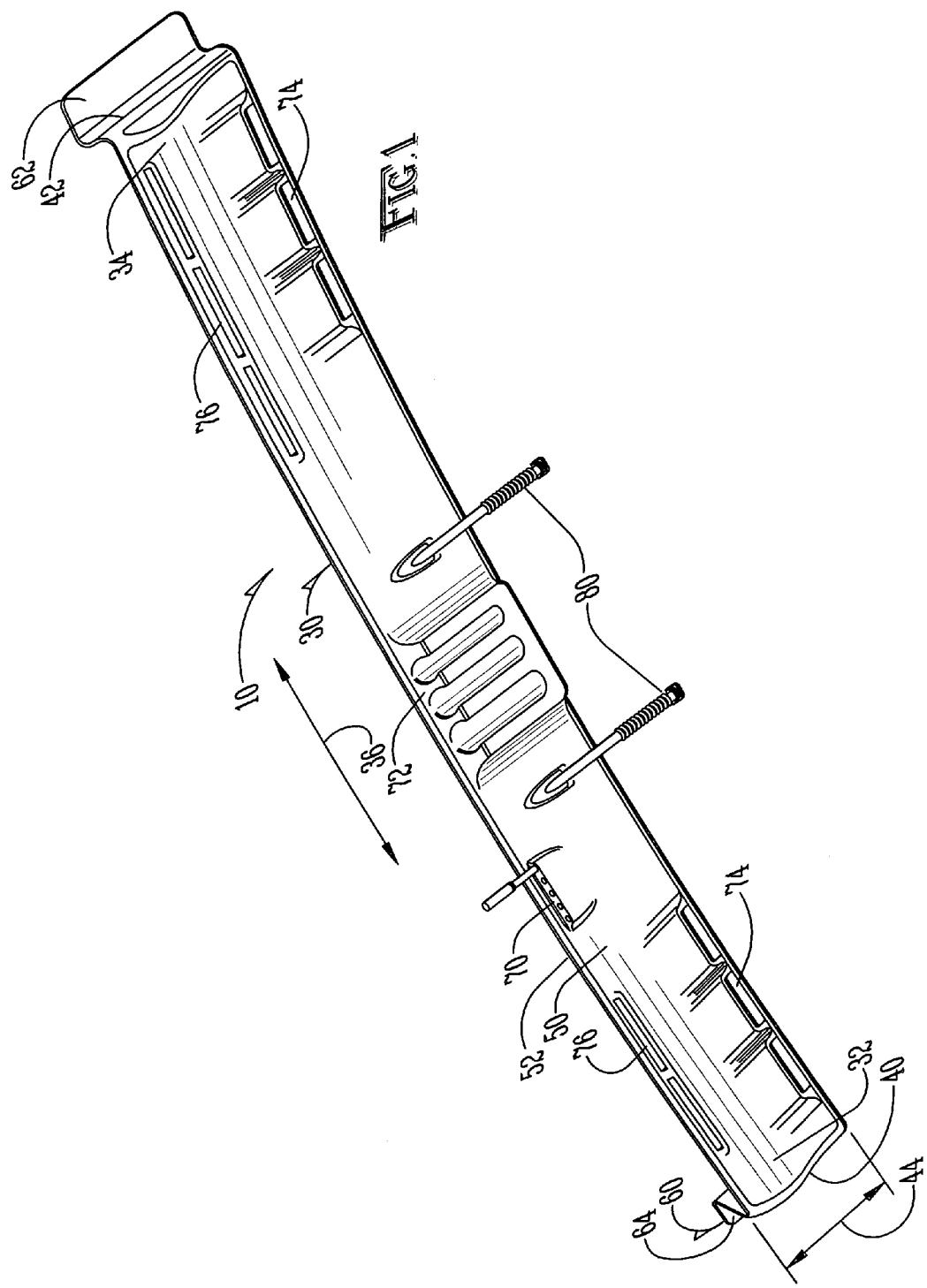
FIG. 1 is a perspective view of a motor vehicle storage accessory embodying the present invention.

Referring to the figures, it can be understood that the present invention is embodied in a storage accessory 10 for use in a motor vehicle 12. Accessory 10 comprises motor vehicle 12 which has a motor vehicle cabin 14 having an interior area 16, and a windshield 18, a headliner 20 located superadjacent to the windshield in the interior of the motor vehicle cabin. A sun visor 22 is movably mounted on the headliner superadjacent to the windshield. There are two sun visors and each sun visor is movable between a stored position shown in FIG. 2 adjacent to the headliner and a use position adjacent to the windshield.

The motor vehicle includes first and second side doors 24 and 26. Each side door is located adjacent to the windshield. Cabin 16 has a cabin width dimension 28 which extends from one side door to the second side door.

A flexible base 30 includes a first end 32 which is located adjacent to the first side door when the base is mounted on the headliner of the motor vehicle, a second end 34 which is located adjacent to the second side door when the base is mounted on the headliner of the motor vehicle and a length dimension 36 which extends between the first end and the second end and which extends in the direction of the cabin width dimension. As can be understood from FIG. 2, length dimension 36 of the flexible base is essentially equal to cabin width dimension 28 so the flexible base extends essentially entirely across the width of the cabin when it is mounted as shown in FIG. 2.

The flexible base further includes a first side edge 40, a second side edge 42 and a width dimension 44 that extends between first side edge 40 and second side edge 42. The flexible base also includes a first surface 50 which is an outer surface when the base is mounted on the headliner of the motor vehicle and a second surface 52 which is a mounting surface when the base is mounted on the headliner of the motor vehicle.

A mounting system 60 includes a first brace 62 on the first end of the base and which extends around molding associated with the first side door and contacts a portion of the motor vehicle cabin adjacent to the first side door when the base is mounted on the headliner of the motor vehicle to attach the first end of the base to the motor vehicle, and a second brace 64 on the second end of the base and which extends around molding associated with the second side door and contacts a portion of the motor vehicle cabin adjacent to the second side door when the base is mounted on the headliner of the motor vehicle to attach the second end of the base to the motor vehicle. The first and second braces can be snap braces or the like.

A plurality of pockets are located on the first surface of the base. These pockets can include a pen holder pocket 70, a coin holder pocket 72, a cassette holder pocket 74, a CD holder pocket 76 and the like. Further support elements 80 can also be included to ensure that the flexible base does not sag in front of the windshield. The support elements are attached to the flexible base and to the headliner adjacent to the base.

Use of the storage accessory embodying the present invention will permit storage of various items in a convenient location adjacent to a driver and/or a passenger yet will not interfere with vision and can store a multitude of articles. Operation of the sun visors will also not be impeded as they move from in front of the storage accessory to adjacent to the windshield in a manner well understood and usual to sun visors. The accessory is easy to mount and dismount and thus a motor vehicle is easily retrofit.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A storage accessory for use in a motor vehicle comprising:
   A) a motor vehicle having
      (1) a motor vehicle cabin having an interior area,
      (2) a windshield,
      (3) a headliner located superadjacent to the windshield in the interior of the motor vehicle cabin,
      (4) a sun visor movably mounted on the headliner superadjacent to the windshield,
      (5) first and second side doors each of which is located adjacent to the windshield, and
      (6) a cabin width dimension which extends from the first side door to the second side door;
   B) a flexible base having
      (1) a first end which is located adjacent to the first side door when the base is mounted on the headliner of the motor vehicle,
      (2) a second end which is located adjacent to the second side door when the base is mounted on the headliner of the motor vehicle,
      (3) a length dimension which extends between the first end and the second end and which extends in the direction of the cabin width dimension, the length dimension of the flexible base being essentially equal to the cabin width dimension,
      (4) a first side edge,
      (5) a second side edge,
      (6) a width dimension that extends between the first side edge and the second side edge,
      (7) a first surface which is an outer surface when the base is mounted on the headliner of the motor vehicle, and
      (8) a second surface which is a mounting surface when the base is mounted on the headliner of the motor vehicle;
   C) a mounting system which includes
      (1) a first brace on the first end of the base and which extends to associate with the first side door and contacts a portion of the motor vehicle cabin adjacent to the first side door when the base is mounted on the headliner of the motor vehicle to attach the first end of the base to the motor vehicle, and
      (2) a second brace on the second end of the base and which extends to associate with the second side door and contacts a portion of the motor vehicle cabin adjacent to the second side door when the base is mounted on the headliner of the motor vehicle to attach the second end of the base to the motor vehicle; and
   D) a plurality of pockets in the first surface of the base.

2. A storage accessory for use in a motor vehicle comprising:
   A) a flexible base having
      (1) a first end which is located adjacent to a first side door of a motor vehicle when the base is mounted on the motor vehicle, and (2) a second end which is located adjacent to a second side door of the motor vehicle when the base is mounted on the motor vehicle;

C) a mounting system which includes
   (1) a first brace on the base and which is located adjacent to the first side door and contacts a portion of the motor vehicle cabin adjacent to the first side door when the base is mounted on the motor vehicle to attach the first end of the base to the motor vehicle, and
   (2) a second brace on the base and which is located adjacent to the second side door and contacts the motor vehicle cabin adjacent to the second side door when the base is mounted on the motor vehicle to attach the second end of the base to the motor vehicle; and D) a plurality of pockets in the base.

3. The storage accessory defined in claim 2 further including a support element connected to the flexible base and attached to the motor vehicle cabin.

* * * * *